US010013365B2

(12) United States Patent
Schlottmann et al.

(10) Patent No.: US 10,013,365 B2
(45) Date of Patent: Jul. 3, 2018

(54) METHOD FOR PROGRAMMING A CONTROL UNIT OF A MOTOR VEHICLE

(71) Applicant: Robert Bosch GmbH, Stuttgart (DE)

(72) Inventors: Eckart Schlottmann, Affalterbach (DE); Udo Schulz, Vaihingen/Enz (DE); Liem Dang, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 155 days.

(21) Appl. No.: 15/052,750

(22) Filed: Feb. 24, 2016

(65) Prior Publication Data
US 2016/0259584 A1 Sep. 8, 2016

(30) Foreign Application Priority Data

Mar. 3, 2015 (DE) .................. 10 2015 203 776

(51) Int. Cl.
G06F 12/14 (2006.01)
G06F 21/57 (2013.01)
H04L 9/08 (2006.01)
H04L 9/32 (2006.01)
G06F 21/44 (2013.01)

(52) U.S. Cl.
CPC .......... G06F 12/1408 (2013.01); G06F 21/44 (2013.01); G06F 21/572 (2013.01); H04L 9/0891 (2013.01); H04L 9/3234 (2013.01); H04L 9/3247 (2013.01); G06F 2212/402 (2013.01); H04L 2209/84 (2013.01)

(58) Field of Classification Search
CPC .......................... G06F 21/572; G06F 11/1068
USPC ........................................................ 726/2
See application file for complete search history.

(56) References Cited

U.S. PATENT DOCUMENTS

| 6,978,152 | B1* | 12/2005 | Yamaashi | G08G 1/092 455/345 |
| 8,856,536 | B2* | 10/2014 | Rabadi | G06F 21/572 713/176 |
| 2005/0160217 | A1* | 7/2005 | Gonzalez | G06F 11/1068 711/6 |
| 2014/0282470 | A1* | 9/2014 | Buga | G06F 8/65 717/170 |
| 2015/0356843 | A1* | 12/2015 | Yang | G08B 13/2477 340/572.1 |

OTHER PUBLICATIONS

Nilsson et al., A Framework for Self-Verification of Firmware Updates over the Air in Vehicle ECUs, Jun. 26, 2009, IEEE, pp. 1-5.*

* cited by examiner

Primary Examiner — Eleni A Shiferaw
Assistant Examiner — Bryan F Wright
(74) Attorney, Agent, or Firm — Norton Rose Fulbright US LLP; Gerard Messina

(57) ABSTRACT

A method for programming a control unit of a motor vehicle, a previous program code executed in the control unit being stored in a memory area, a new program code being written into the control unit, and a check of this new program code being carried out, the program code being executed by the control unit if the new program code is successfully verified in the course of the check, and the previous program code stored in the memory area being written from the memory area into the control unit and the previous program code being executed by the control unit if the new program code is not successfully verified in the course of the check.

12 Claims, 2 Drawing Sheets

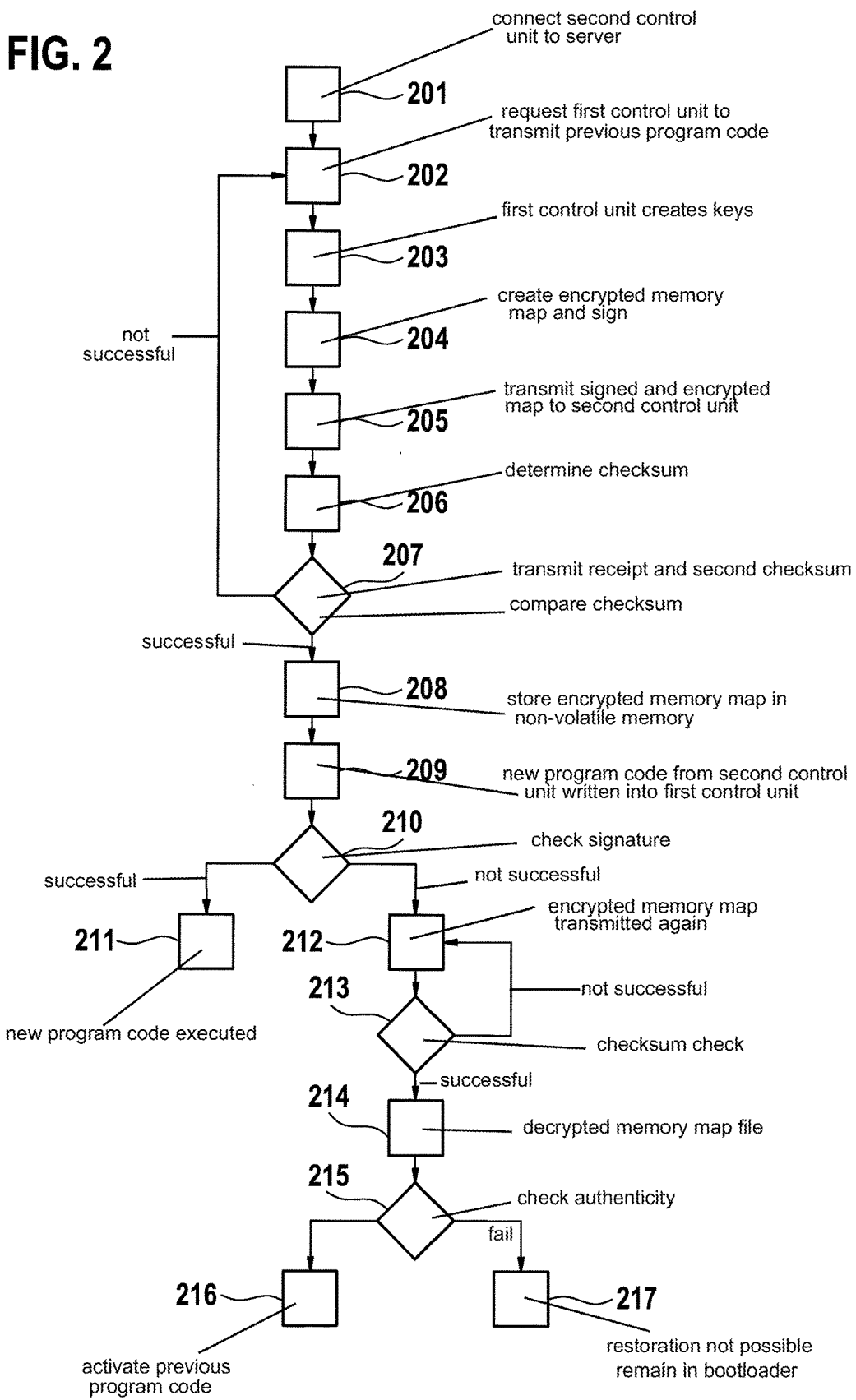

METHOD FOR PROGRAMMING A CONTROL UNIT OF A MOTOR VEHICLE

CROSS REFERENCE

The present application claims the benefit under 35 U.S.C. § 119 of German Patent Application No. 102015203776.2 filed on Mar. 3, 2015, which is expressly incorporated herein by reference in its entirety.

FIELD

The present invention relates to a method for programming a control unit.

BACKGROUND INFORMATION

Programming control units of motor vehicles may be carried out in most cases during a production process or manufacturing process of the motor vehicle, for example, at the end of a production line or in a repair shop in the course of maintenance or repair work. In the course of such programming, for example, a firmware update may be carried out, for example, a new, revised program code being written into the control unit. For this purpose, a computing unit may be connected to the control unit, and the new program code may be transmitted to the control unit. In this case, a program code previously stored and executed in the control unit is deleted or overwritten by the new program code.

In the course of so-called firmware-over-the-air (FOTA) programming or over-the-air (OTA) programming, programming of control units may also be carried out in the field itself. For this purpose, the new program code may be wirelessly transmitted to the vehicle via a radio contact, for example, WLAN or mobile networks, for example, from a server of the vehicle manufacturer.

For protection against chip tuning and malicious software, for example, from unauthorized parties, it is highly important to subject new program code introduced into a control unit to a signature check and to verify the new program code. If this signature check fails and if it is not possible to successfully verify the new program code, the new program code is marked as invalid and its execution is prevented. In this case, there is the risk that the control unit will remain in the bootloader, and normal operation will no longer be achievable. In order to put the control unit back into normal operation, in this case, a valid program code must again be transmitted to the control unit.

During the production or manufacturing process or in a repair shop, it is usually no problem to retransmit a valid program code to the control unit in such a case, since access to verified, valid program code is ensured here, and this program code is, for example, stored in a central database and/or in storage media.

In the case of programming a control unit in the field (FOTA, OTA), such access to a verified, valid program code is no longer ensured. If, for example, the radio contact between the vehicle and the server of the vehicle manufacturer is interrupted, for example, if the vehicle is situated in a closed underground garage, in a tunnel, or in a dead spot, it is potentially no longer readily possible to transmit a valid program code to the control unit and to restore the functionality of the control unit.

When programming a control unit in the field via radio contacts, the risk thus exists that the corresponding control unit is no longer able to ensure normal operation and in addition, that it is no longer possible to transmit valid program code to the control unit without transporting the vehicle to a repair shop.

It is therefore desirable to provide an improved option for programming a control unit of a motor vehicle, with the aid of which reliable programming of the control unit is made possible, particularly in the field.

SUMMARY

In accordance with the present invention, a method is provided for programming a control unit of a motor vehicle. Advantageous embodiments are described below.

In accordance with an example method, a firmware update of the control unit is to be carried out, in the course of which a previous program code executed in the control unit is to be replaced in particular by a new program code.

The previous program code executed in the control unit is stored in a memory area, in particular in an internal control unit memory or in another type of separate memory situated in the vehicle. In particular, the previous program code is stored in an encrypted manner. In this case, the previous program code is encrypted before the data transmission to the separate memory. Subsequently, a new program code is written into the control unit. In this case, in particular, the previous program code in the control unit is overwritten or deleted by the new program code.

A check of this new program code is carried out. In particular, a signature check or an authentication check of the new program code is carried out. In particular, it is checked whether the new program code was created by an authorized party, for example, the manufacturer of the motor vehicle or of the control unit. In particular, it is ensured that the new program code is not malicious software.

If the new program code is successfully verified or authenticated in the course of the check, the new program code is executed by the control unit. In this case, the new program code is not malicious software and may be executed without risk. In this case, the previous program code stored in the memory area may be deleted or the memory area may be overwritten by new data.

If the new program code is not successfully verified or authenticated in the course of the check, the previous program code stored in the memory area is transferred back from the memory area and decrypted. The decrypted previous program is written into the control unit and replaces the memory content which was detected as unverified. The previous program code is then executed by the control unit. Since, in this case, the new program code is possibly malicious software and constitutes a potential risk for the control unit, the execution of this new program code is prevented. In particular, the new program code in the control unit is overwritten or deleted by the previous program code.

With the aid of the present invention, an option is provided for being able to execute a verified, valid program code in the control unit at any time in the course of programming the control unit. The present invention in particular provides an option for storing a fallback program or a fallback program code in the vehicle. Even if the new program code is not successfully verified and possibly constitutes malicious software and a potential risk, it is prevented that the control unit functions in a limited manner or not at all.

In the case of an unsuccessfully verified new program code, the program code which was executable before the introduction of the new program code may be easily executed. No additional logistics are required for this purpose. The previous program code may again be made available in the control unit in particular without transmitting data from outside the vehicle.

The previous program code is in particular stored in a nonvolatile memory. In particular, the previous program code is stored in a nonvolatile memory of the control unit or an additional control unit of the motor vehicle. Of course, the previous program code may also be stored in multiple memory areas. A memory area already present in the motor vehicle or an additionally implemented memory area may be used as a memory area. The memory area may in particular be used for programming all control units of the motor vehicle.

Advantageously, the new program code is transmitted to the motor vehicle via a wireless connection, in particular via a radio contact, for example, via WLAN or via a mobile network. Preferably, the new program code is written into the control unit in the course of over-the-air programming (OTA) or firmware-over-the-air programming (FOTA). Thus, programming of the control unit is preferably carried out in the field. In this case, the new program code may be directly transmitted to the control unit or to an additional control unit of the motor vehicle via the wireless connection and may be written into the control unit from this additional control unit. In particular, the new program code is transmitted from a server of the vehicle or control unit manufacturer to the motor vehicle via the wireless connection.

As mentioned at the outset, the wireless radio connection may be interrupted, for example, if the vehicle is situated in a closed underground garage, in a tunnel, or in a dead spot. With the aid of the present invention, it is ensured that a verified, valid program code may be executed in the control unit at any time, even if the wireless radio contact is interrupted. The restoration of the previous program code in the case of unsuccessfully verified new program code is independent of the wireless connection and may also be carried out without it in the field. The vehicle does not have to be transported to a repair shop especially for this purpose.

Preferably, the new program code is written into the control unit by a programming unit. This programming unit is preferably provided as an additional control unit of the motor vehicle. As explained above, the new program code is preferably transmitted via the wireless connection to the additional control unit of the motor vehicle (preferably in the course of the OTA or FOTA) and written into the control unit from this additional control unit. This additional control unit may in particular be designed to communicate with the server of the motor vehicle or control unit manufacturer via the wireless connection.

Alternatively, the programming unit may preferably be designed as an external computing unit. This external computing unit is in particular connected to the control unit via a wired connection. The new program code may be written into the control unit by the external computing unit in particular in the course of the production or manufacturing process of the motor vehicle or also in particular in a repair shop, for example, in the course of maintenance or repair work. In particular, a suitable program may be executed by the external computing unit for this purpose.

Preferably, the previous program code is stored in a memory area of the programming unit. As explained above, the previous program code is thus in particular stored in a memory area of the additional control unit. This lends itself in particular to the transmission of the new program code via the wireless connection or in the course of the OTA or FOTA programming.

However, the previous program code may also be stored in particular in the external computing unit.

Advantageously, the previous program code executed in the control unit is encrypted, and this encrypted previous program code is stored in the memory area. If the new program code is not successfully verified, the encrypted previous program code stored in the memory area is transferred from the memory area into the control unit, decrypted, written, and re-executed. In particular if a control unit-specific key is used for the encryption and decryption, the previous program code may be decrypted again only by the control unit itself. The previous program code is thus securely stored in the memory area, so that an attacker is not able to read out or change the previous program code. In particular, if the new program code is malicious software, it may be prevented that this malicious software reads out or changes the stored program code. Chip tuning is thus prevented, and it is ensured that expert knowledge is protected.

The previous program code includes in particular data which are required for the control and the operation of the motor vehicle, for example, specific control commands, technical data, control values, or characteristic values. These commands or values were often ascertained and optimized by the manufacturer in multi-year development processes at great research cost via long-term, complex test series. It is thus in the interest of the manufacturer that these data are not able to be read out by a third party, i.e., an attacker, in order to guarantee the protection of expert knowledge.

Preferably, a key for encrypting and/or for decrypting the previous program code is created by the control unit. Alternatively, a key already present in the control unit may also preferably be used for encrypting and/or for decrypting the previous program code. In particular, the key for encrypting and/or for decrypting the previous program code is stored in a memory area of the control unit, in particular in a nonvolatile memory area of the control unit, further in particular in a secured memory area. Advantageously, this memory area of the control unit in which the key is stored is different from the memory area in which the previous program code is stored.

The key, thus, does not leave the control unit at any time and cannot be acquired by an attacker. Thus, it is in particular ensured that the previous program code is able to be re-decrypted exclusively by the control unit itself and that the previous program code is able to be executed only in this control unit. The previous program code may thus also be kept secret during transmission between different control units in the onboard electrical system of the motor vehicle.

Preferably, the key is stored in a hardware security module (HSM) of the control unit. Such a hardware security module is usually also provided in addition to a conventional processor unit (processor system component, PS) in the control unit. Similarly to a conventional processor unit, the HSM includes in particular one or multiple processor cores and a local memory (ROM, RAM, flash, EEPROM). The HSM includes in particular separate physical resources (processor core(s), local memory, etc.), which are independent of the physical resources of the processor unit. The resources of the HSM may in particular be shielded on the hardware level with respect to the resources of the processor unit. The HSM constitutes an isolated, secure environment which is protected against manipulation and attacks, among other things, from the processor unit.

Preferably, an authenticity feature is added to the previous program code executed in the control unit. The previous program code provided with the authenticity feature is stored in the memory area. For example, a signature or a cryptographic signature and/or a checksum may be added as an authenticity feature. In particular, the previous program code may be signed with the key with which it is also encrypted. The authenticity feature may be added before or after the encryption of the previous program code. By adding such an authenticity feature, the previous program code may be protected against manipulation by attackers.

If the previous program code stored in the memory area is rewritten into the control unit, an authenticity of the previous program code is advantageously checked, based on the authenticity feature. It is thus ensured that the previous program code was not manipulated by an attacker.

If this authenticity check fails and authenticity of the previous program code is not determined, there is the risk that the previous program code was deliberately manipulated by an attacker. In this case, the previous program code in particular is not executed. The control unit remains, for example, in the bootloader.

Preferably, the previous program code executed in the control unit is stored in the memory area in that a memory map of the control unit is created and stored in the memory area. Preferably, this memory map is initially encrypted with the aid of the key and is stored encrypted in the memory area. In such a memory map, in particular a memory map file is created which reflects both (file system) structures and all files or contents of the control unit.

Preferably, an error detection method, in particular an error correction method, is carried out for the transfer of the previous program code into the memory area. In particular, for this purpose, a cyclic redundancy check (CRC) is carried out. In this case, redundancy information, for example, in the form of checksums, is added to the data to be transferred. If the previous program code was transferred into the memory area, this checksum is compared with a calculated checksum. If these two checksums are identical, the transfer into the memory area was successful; otherwise, the transfer is carried out again. In the course of a cyclic redundancy check, in particular a CRC checksum is used which is based on polynomial long division.

A computing unit according to the present invention, for example, a control unit of a motor vehicle, is in particular configured in terms of programming to carry out a method according to the present invention.

The implementation of the method in the form of software is also advantageous, since this entails particularly low costs, in particular if an executing control unit is also used for additional tasks and is therefore present in any case. Suitable data carriers for providing the computer program in particular include diskettes, hard disks, flash memories, EEPROMs, CD-ROMs, DVDs, and others. A download of a program via computer networks (Internet, intranet, etc.) is also possible.

Additional advantages and example embodiments of the present invention are described below and are shown in the figures.

The present invention is schematically depicted in the figures based on exemplary embodiments and is described below with reference to the figures.

BRIEF DESCRIPTION OF THE DRAWINGS

FIG. 2 schematically shows a preferred specific embodiment of a method according to the present invention in the form of a block diagram.

DETAILED DESCRIPTION OF EXAMPLE EMBODIMENTS

Figure 1:
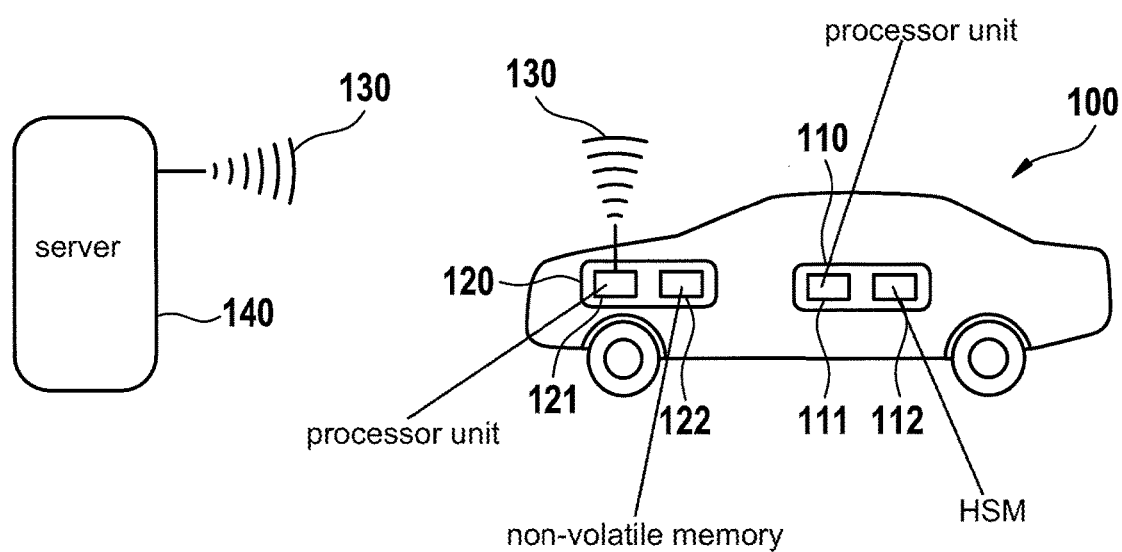
FIG. 1 schematically shows a motor vehicle including a control unit, which is configured to carry out a preferred specific embodiment of a method according to the present invention.

FIG. 1 schematically depicts a motor vehicle 100 including a first control unit 110 and including a second control unit 120. Of course, motor vehicle 100 may include additional control units which are not depicted here for the sake of simplicity.

First control unit 110 includes a processor unit 111 including a processor core and a local memory. Furthermore, first control unit 110 includes a hardware security module (HSM) 112, also including a processor core and a local memory which are independent of processor unit 111.

Second control unit 120 also includes a processor unit 121 including a processor core and a local memory, and also a memory area 122 in the form of a nonvolatile memory. Nonvolatile memory 122 may be provided as part of processor unit 121 or independently of it.

Second control unit 120 may be connected to a server 140 of the motor vehicle manufacturer via a wireless connection 130, for example, via a mobile network.

Obsolete firmware is executed in processor unit 111, which is referred to below as previous program code. This obsolete firmware is to be replaced by a new version of the firmware, referred to as new program code below, in the course of a firmware update.

For this purpose, motor vehicle 100 is configured to carry out a preferred specific embodiment of a method according to the present invention, which is depicted in FIG. 2 as a block diagram and is explained below with reference to FIG. 2.

The firmware update of first control unit 110 is carried out with the aid of firmware-over-the-air programming. Second control unit 120 constitutes a programming unit which receives the new program code from server 140 and writes it into first control unit 110.

For this purpose, in step 201, second control unit 120 is connected to server 140 via mobile network 130. After a wireless connection 130 has been established, the new program code is transmitted via mobile network 130 from server 140 to second control unit 120 and stored in its processor unit 121.

In step 202, second control unit 120 requests that first control unit 110 transmits the previous program code to second control unit 120. For this purpose, in step 203, keys for encrypting and decrypting and for signing the previous program code are created by first control unit 110 and stored in HSM 112.

In step 204, a memory map of first control unit 110 is created, in particular a memory map of processor unit 111. A corresponding memory map file is encrypted using the keys created in step 203.

Furthermore, in step 204, this encrypted memory map file is signed with the aid of the key created in step 203. Thus, a cryptographic signature is added to the encrypted memory map file as an authentication feature.

It may be pointed out that the sequence of the encryption and signing in step 204 is arbitrary, i.e., in particular, it is also possible to sign initially and to encrypt subsequently.

Furthermore, checksum information is added to the memory map file in the form of a first checksum. Thus, a checksum check (for example, a cyclic redundancy check, CRC) is made possible.

In step 205, the encrypted and signed memory map file is transmitted from first control unit 110 to second control unit 120. Furthermore, in step 206, a second checksum is determined by second control unit 120.

In step 207, second control unit 120 transmits a receipt to first control unit 110 along with the second checksum. This second checksum is compared with the first checksum in the course of the checksum check.

If these two checksums are identical, the transmission of the previous program code to second control unit 120 was successful. If the two checksums are not identical, the transmission of the previous program code was not successful, and the method starts again at step 202.

After the previous program code has been transmitted successfully, it is stored in nonvolatile memory 122 of programming unit 120. For this purpose, in step 208, the encrypted memory map file is stored in nonvolatile memory 122 of second control unit 120.

In step 209, the new program code is written from second control unit 120 into first control unit 110, in particular into processor unit 111. In this case, the previous program code is overwritten in processor unit 111. Subsequently, in step 210, a check, in particular a signature check of the new program code, is carried out in control unit 110.

If the new program code is successfully verified or authenticated in the course of the signature check, the new program code is executed by first control unit 110 in step 211. Nonvolatile memory 122 of second control unit 120 may be deleted or overwritten by other data.

However, if the new program code is not successfully verified or authenticated, this program code possibly constitutes malicious software and a potential risk for first control unit 110. In this case, in step 212, the encrypted memory map file is again transmitted from nonvolatile memory 122 into processor unit 111 of first control unit 110. The new program code is completely deleted from processor unit 111.

In step 213, a checksum check is again carried out, and it is checked whether the encrypted memory map file was correctly transmitted from second control unit 120 to first control unit 110. If the transmission was not successful, it is carried out again.

If the transmission was successful, in step 214, the encrypted memory map file is decrypted and written by first control unit 110 with the aid of the keys stored in HSM 112.

In step 215, an authenticity of the decrypted previous program code is checked, based on the authentication feature added in step 204. If this check is successful, in step 216, the decrypted previous program code is activated and executed by first control unit 110. Flash memory 122 of second control unit 120 may be deleted or overwritten by other data.

If the authenticity check fails, the encrypted previous memory map was, for example, deliberately manipulated by an attacker. In this case, restoration is not possible, and in a step 217, control unit 110 remains in the bootloader and may again be programmed with a valid program and put into normal operation by a repair shop tester.

It may be pointed out that the decryption and authentication in steps 214 and 215 advantageously take place in the opposite sequence from the encryption and signing in step 204. In the present example, in step 204, encryption was performed first, followed by signing; thus, in steps 214 and 215, authentication is performed first, followed by decryption. In no case is the memory map adopted if the authentication fails.

What is claimed is:

1. A method for programming a control unit of a motor vehicle, the method comprising:
    storing in a memory area, which is associated with a second control unit, a previous program code executed in the control unit, wherein the control unit includes a hardware security module;
    writing a new program code into the control unit and checking the new program code;
    executing the new program code by the control unit if the new program code is successfully verified in the checking; and
    writing the previous program code stored in the memory area of the second control unit from the memory area of the second control unit into the control unit and executing the previous program code by the control unit, if the new program code is not successfully verified in the checking;
    wherein the previous program code executed in the control unit is encrypted and the encrypted previous program code is stored in the memory area of the second control unit,
    wherein a key for at least one of encrypting and decrypting the previous program code is stored in a memory area of the control unit,
    wherein the key for at least one of encrypting and decrypting the previous program code is stored in the hardware security module of the control unit,
    wherein a memory map file is encrypted using the key to provide an encrypted memory map file, and
    wherein the encrypted memory map file is signed with the aid of the key or a second key, so that a cryptographic signature is added to the encrypted memory map file as an authentication feature.

2. The method as recited in claim 1, wherein the new program code is transmitted to the motor vehicle via a wireless connection.

3. The method as recited in claim 1, wherein the new program code is written into the control unit in the course of over-the-air programming or firmware-over-the-air programming.

4. The method as recited in claim 2, wherein the new program code is written into the control unit by a programming unit of the second control unit, which is external to or an additional control unit of the motor vehicle.

5. The method as recited in claim 4, wherein second control unit is the additional control unit, and wherein the new program code is transmitted to the additional control unit of the motor vehicle via the wireless connection.

6. The method as recited in claim 4, wherein the previous program code is stored in a memory area of the programming unit of the second control unit.

7. The method as recited in claim 1, wherein an authenticity feature is added to the previous program code executed in the control unit and the previous program code provided with the authenticity feature is stored in the memory area.

8. The method as recited in claim 7, wherein if the previous program code provided with the authenticity feature and stored in the memory area is written from the memory area into the control unit, an authenticity of the previous program code is checked, based on the authenticity feature.

9. The method as recited in claim 1, wherein the previous program code executed in the control unit is stored in the memory area, in that the memory map of the control unit is stored in the memory area.

10. The method as recited in claim 1, wherein an error correction method is carried out for the transfer of the previous program code into the memory area.

11. A computing device, comprising:
    a memory; and
    a control processor configured to perform the following:
        storing in a memory area of a second controller a previous program code executed in the control unit, wherein the control processor includes a hardware security module;
        writing a new program code into the control processor and checking the new program code;
        executing the new program code by the control processor if the new program code is successfully verified in the checking, and
        writing the previous program code stored in the memory area of the second controller from the memory area into the control processor and executing the previous program code by the control processor, if the new program code is not successfully verified in the checking;
        wherein the previous program code executed in the control processor is encrypted and the encrypted previous program code is stored in the memory area of the second controller,
        wherein a key for at least one of encrypting and decrypting the previous program code is stored in a memory area of the control processor,
        wherein the key for at least one of encrypting and decrypting the previous program code is stored in the hardware security module of the computing device,
        wherein a memory map file is encrypted using the key to provide an encrypted memory map file, and
        wherein the encrypted memory map file is signed with the aid of the key or a second key, so that a cryptographic signature is added to the encrypted memory map file as an authentication feature.

12. A non-transitory machine-readable storage medium storing a computer program, which is executable by a processor, comprising:
    a program code arrangement having program code for programming a control unit of a motor vehicle, by performing the following:
        storing in a memory area of a second control unit a previous program code executed in the control unit, wherein the control unit includes a hardware security module;
        writing a new program code into the control unit and checking the new program code;
        executing the new program code by the control unit if the new program code is successfully verified in the checking; and
        writing the previous program code stored in the memory area of the second control unit from the memory area into the control unit and executing the previous program code by the control unit, if the new program code is not successfully verified in the checking;
        wherein the previous program code executed in the control unit is encrypted and the encrypted previous program code is stored in the memory area of the second control unit,
        wherein a key for at least one of encrypting and decrypting the previous program code is stored in a memory area of the control unit,
        wherein the key for at least one of encrypting and decrypting the previous program code is stored in the hardware security module of the control unit,
        wherein a memory map file is encrypted using the key to provide an encrypted memory map file, and
        wherein the encrypted memory map file is signed with the aid of the key or a second key, so that a cryptographic signature is added to the encrypted memory map file as an authentication feature.

\* \* \* \* \*